(12) United States Patent
Cornelius et al.

(10) Patent No.: US 6,687,700 B1
(45) Date of Patent: Feb. 3, 2004

(54) COMMUNICATIONS SYSTEM FOR SUPPORTING INTER-DEPENDENT DATA MESSAGES

(75) Inventors: Shawn S. Cornelius, Strongsville, OH (US); Arnold Z. Huffman, Chicago, IL (US); Matthew C. Klug, Hudson, OH (US); Stamatios Kostakis, North Olmstead, OH (US); Richard R. Krahn, Northlake Elmo, MN (US); Eric C. Su, Foster City, CA (US); Michael S. Sweeney, Parma Heights, OH (US)

(73) Assignee: Accenture LLP, Chicago, IL (US)

( * ) Notice: Subject to any disclaimer, the term of this patent is extended or adjusted under 35 U.S.C. 154(b) by 428 days.

(21) Appl. No.: 09/709,980

(22) Filed: Nov. 9, 2000

(51) Int. Cl.[7] .............................................. G06F 17/30
(52) U.S. Cl. ........................................ 707/10; 709/217
(58) Field of Search ............................ 707/10; 709/217

(56) References Cited

U.S. PATENT DOCUMENTS

| | | | | |
|---|---|---|---|---|
| 5,222,063 A | * | 6/1993 | Foglar et al. | 370/220 |
| 5,255,268 A | * | 10/1993 | Cato et al. | 370/405 |
| 5,752,055 A | | 5/1998 | Redpath et al. | 713/15.8 |
| 5,931,916 A | * | 8/1999 | Barker et al. | 709/239 |
| 5,937,161 A | | 8/1999 | Mulligan et al. | 709/206 |
| 6,104,797 A | | 8/2000 | Nabkel et al. | 379/201.01 |
| 6,138,168 A | * | 10/2000 | Kelly et al. | 709/310 |
| 6,148,402 A | * | 11/2000 | Campbell | 713/200 |
| 6,173,399 B1 | | 1/2001 | Gilbrech | 713/153 |

* cited by examiner

Primary Examiner—Jack M. Choules
(74) Attorney, Agent, or Firm—Brinks Hofer Gilson & Lione (57) ABSTRACT

A communication system and method for supporting the communication of inter-dependent data messages includes determining if a later data message represents an inter-dependent message affiliated with an earlier data message. The communication system and method determines whether a condition associated with the earlier inter-dependent data message is fulfilled. If the condition is fulfilled, communication system executes a command associated with the fulfilled condition and the later inter-dependent data message.

19 Claims, 7 Drawing Sheets

| MESSAGE TYPE IDENTIFIER | CONDITION (E.G., MESSAGE DEPENDENCY CHARACTERISTIC) | COMMAND (E.G., MESSAGE HANDLING COMMAND) |
|---|---|---|
| 00 | SOFT INTERDEPENDENT | TRANSMIT LATER DATA MESSAGE ONLY. |
| 01 | SOFT INTERDEPENDENT | TRANSMIT LATER DATA MESSAGE AND DELETE EARLIER DATA MESSAGES. |
| 10 | HARD INTERDEPENDENT | TRANSMIT BOTH EARLIER AND LATER DATA MESSAGES. |
| 11 | HARD INTERDEPENDENT | TRANSMIT EARLIER DATA MESSAGE PRIOR TO LATER DATA MESSAGES IN SEQUENTIAL ORDER. |

COMMUNICATIONS SYSTEM FOR SUPPORTING INTER-DEPENDENT DATA MESSAGES

FIELD OF THE INVENTION

This invention relates to a communications system for supporting inter-dependent data messages

BACKGROUND OF THE INVENTION

A communications device, such as a server, may act as an intermediary for storing and forwarding data messages in a communication network. For example, the communications device functions as an intermediary where the communications device intercepts and processes data messages that are sent from a source communications device to a destination communications device. The source communications device may be associated with a first business entity. The destination communications device may be associated with a second business entity. Accordingly, the intermediary communication device that is interposed in a communications path between the first business entity and the second business entity is sometimes referred to as a business-to-business brokering architecture.

A conventional brokering architecture may provide an inadequate message inter-dependency scheme for reliable data processing. If a communications disruption of the transmission of a data message occurs, the communications system may waste time and resources sending outdated data messages, which are related to the disrupted data message. Alternately, the communications system may receive data messages, which are related to the disrupted data message, in an unexpected or unknown order that corrupts data integrity. For example, a message inter-dependency scheme may not support restrictions on the transmission of data messages to prevent overwriting of the most accurate data messages by less accurate data messages.

Business-to-business brokering architectures have been used to route data messages between computer systems of different organizations within a single enterprise. For example, a brokering architecture optimized for an intra-enterprise environment may be configured with capabilities for storing and forwarding data messages, routing data messages, transforming the format of data messages, recovering data messages, and restarting data message transmission after a disruption to data flow. However, an intra-enterprise or inter-enterprise brokering architecture may have inadequate security provisions for secure use over a communications network, such as the Internet. Thus, a need exists for a communication system that meets the security requirements and message inter-dependency requirements to facilitate reliable operation of the communications system in an inter-enterprise environment over a communication network, such as the Internet.

SUMMARY OF THE INVENTION

In accordance with the invention, a communications system and method supports handling of inter-dependent data messages to facilitate reliable communications despite a communications disruption. The communications system assigns dependency characteristics to corresponding message types. The communications system determines if a communication disruption has occurred. The communication system executes a message handling command if the disruption occurred. The message handling may reduce or eliminate transmissions of redundant or outdated data messages to reduce the burden on communications resources (e.g., bandwidth of a channel over a communications network). Further, the message handling may filter out unwanted or outdated data messages to obviate the danger of replacing or overwriting a later more accurate data message with an outdated data message.

DETAILED DESCRIPTION OF PREFERRED EMBODIMENTS

Figure 1:
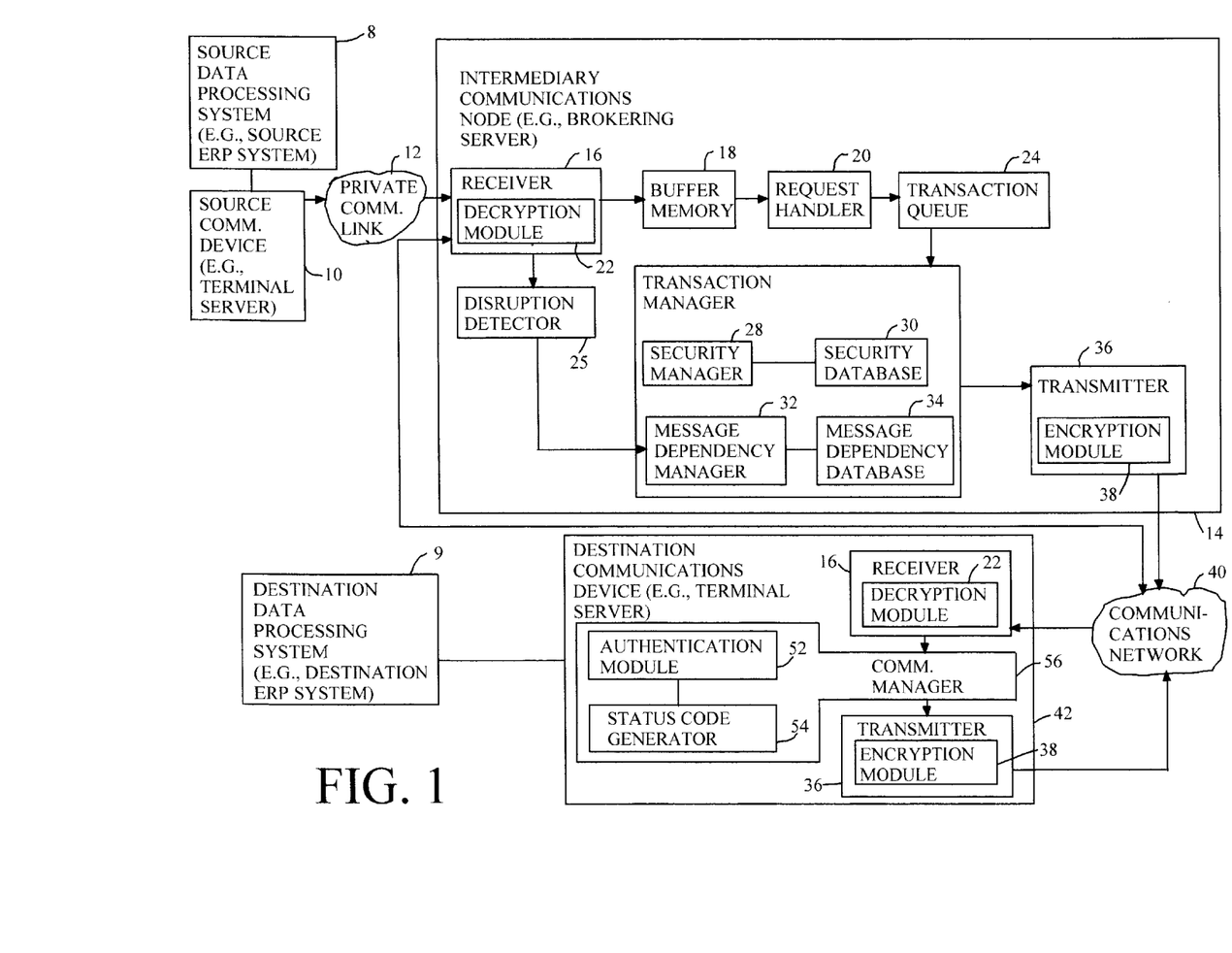
FIG. 1 is a block diagram of a communication system including an intermediary communications node in accordance with the invention.

In accordance with the invention, FIG. 1 shows a system 11 for supporting inter-dependent data messages for transmission over a communication network 40 between a source data processing system 8 (e.g., source enterprise resource planning system) and a destination data processing system 9 (e.g., destination enterprise resource planning system). The system 11 includes a source data processing system 8 that is coupled to a source communications device 10. The source communications device 10 communicates to an intermediary communications node 14 via a private or secure communications link 12. In turn, the intermediary communications node 14 is adapted to communicate with a destination communications device 42 via a communications network 40, such as the Internet. The destination communications device.42 is coupled to a destination data processing system 9.

The source data processing system 8 and the source communications device 10 are preferably associated with a first business entity, whereas the destination data processing system 9 and the destination communications device 42 are preferably associated a second business entity. Further, the intermediary communications node 14 may be located on the premises of the first business entity or elsewhere. The private communications link 12 between the source communications device 10 and the intermediary communications node 14 may represent a dedicated line, a private telecommunications channel, or a secure channel over a communications network to provide private communications to provide secure or private communications.

The source data processing system 8 refers to a data processing system that supports an operational or business function of the first business entity. A source data processing system 8 may include one or more of the following items: a purchasing system, an accounting system, a manufacturing system, and an enterprise resource planning system. Similarly, the destination data processing system 9 refers to a data processing system that supports an operational or business function of the second business entity.

The source data processing system 8 directly or indirectly exchanges data messages (e.g., business-to-business data) with the destination data processing system 9 via the source communications device 10, the private communications link 12, the intermediary communications node 14, the communications network 40, and the destination communications device 42.

The source communications device 10 may provide a communications interface between the source data processing system 8 and the private communications link 12 or the communications network 40 to facilitate communications. The source communications device 10 may facilitate translation or formatting of data messages to a proper data structure and protocol for transmission over the communications network 40.

In general, the intermediary communications node 14 may comprise a data processing system, a store-and-forward telecommunications device, a communications server, a brokering server, or another network element interposed in a communication path between a source communications device 10 and a destination communications device 42. For example, the source communications device 10 and the destination communications device 42 may comprise terminal servers, whereas the intermediary communications node 14 may comprise a business-to-business brokering server.

The intermediary communications node 14 includes a receiver 16 coupled to buffer memory 18. The buffer memory 18 communicates with a request handler 20. In turn, the request handler 20 communicates with a transaction queue 24. A transaction manager 26 is adapted to access the transaction queue 24. The transaction manager 26 communicates with a transmitter 36.

The receiver 16 may include a decryption module 22 for decrypting encrypted communications transmitted to the intermediary communications node 14 from the source communications device 10, the destination communications device 42, or another network element coupled to the communications network 40.

The buffer memory 18 receives data messages from the receiver 16. The buffer memory 18 refers to a data staging area for temporary storage of the data messages prior to processing by the request handler 20. The buffer memory 18 has a storage capacity that may be determined based on the volume of traffic or data messages transmitted between the source communications device 10 and the intermediary communication node 14, as well as the processing capability of the intermediary communications node 14.

The request handler 20 reviews the data messages in the buffer memory 18 for placement into the transaction queue 24 consistent with a priority scheme. The request handler 20 removes or transfers data messages from the buffer memory 18 into the transaction queue 24 to organize the data messages in the transaction queue 24 based upon a priority scheme.

The transaction queue 24 refers to a portion of memory or data storage, which is allocated to store data messages for transmission from the intermediary communications node 14 in accordance with the priority scheme. The request handler 20 may assign the data messages different positions of the transaction queue 24 based upon the priority levels associated with the corresponding data messages.

The transaction manager 26 accesses the data messages in the transaction queue 24 to perform processing associated with the data messages. The transaction manager 26 includes a security manager 28 coupled to security database 30. The security manager 28 manages and maintains secure communications between the intermediary communications node 14 and the destination communications device 42. To this end, the security database 30 may store and maintain a submittal login identifier and a corresponding submittal password for submission to the destination communications device 42 to establish a communications channel. The transmitter 36 of the intermediary communications node 14 may transmit the submittal log-in identifier and the corresponding submittal password to establish communications access between at least the intermediary communications node 14 and the destination communications device 42. For example, communications access may be supported between the source data processing system 8 and the destination data processing system 9. The security database 30 may contain encryption codes or references to encryption codes stored elsewhere for the encryption module 38, the decryption module 22, or both.

The submittal log-in identifier, the submittal password, and at least one submittal encryption code of the security database 30 may be updated on a regular or a random basis as is necessary or appropriate to further enhance security measures. The destination communications device 42 may maintain an authentication database (not shown) with an up-to-date reference log-in identifier, reference password and at least one reference encryption code that mirrors the submittal log-in identifier, the submittal password, and at least one submittal encryption code resident in the security database 30.

In an alternate embodiment, the intermediary communications node 14 may simultaneously or serially act as an intermediary between multiple destination communications devices 42, although only one destination communications device 42 is shown in FIG. 1. Accordingly, in the alternate embodiment, the security database 30 may contain one submittal log-in identifier, one submittal password, and at least one encryption code for each corresponding destination communications device 42.

The transaction manager 26 includes a message-dependency manager 32 coupled to message-dependency database 34. The message-dependency manager 32 invokes an inter-dependent message handling scheme in response to the detection of a communications disruption of the transmission of an earlier data message of a group. The disruption detector 25 determines if a communications disruption of an earlier transmitted data message has occurred by the presence or absence of feedback from the destination communication device 42. Upon detection of the disruption, the message-dependency manager 32 checks the message type identifiers of the data messages of the group in the transaction queue 24 or the buffer memory 18. The message-dependency manager 32 accesses the message-dependency database 34 to retrieve handling commands for managing the handling (e.g., processing and transmission) of inter-dependent data messages. In one embodiment, a group of inter-dependent data messages is flagged with one or more of the following items to indicate the inter-dependency among the members of the group: (1) message type identifier, (2) source identifier or source address, (3) destination identifier or destination address, and (4) time stamp of message creation time. The header of a data message may contain the message type identifier, the source identifier or address, and a destination identifier or address.

The message-dependency database 34 preferably stores affiliations among inter-dependent data messages by the message type identifiers, or otherwise. The transaction manager 26 may execute message handling commands applicable to a group of data messages associated with an earlier disrupted data message. The message handling commands are based upon a dependency among different data messages defined in the message-dependency database 34.

The transaction manager 26 may transform the data structure of the data message for compatibility with the communications network 40. The communications network 40 may comprise the Internet. Accordingly, the transaction manager 26 may format the data messages as a hyper-text protocol (HTTP) document or an extensible mark-up language (XML) document, or another standard data structure compatible with the communications network 40.

The transmitter 36 places the data message in a suitable physical form in conformance with a physical layer for transmission over the communication network 40. For example, the transmitter 36 may packetize the data packets in an HTTP protocol document or an XML document into a synchronous transfer mode data packets or Internet protocol data packets for transmission over the communication network 40.

The transmitter 36 may include an encryption module 38 for encrypting transmissions to the destination communications device 42 via the communications network 40. The encryption module 38 may use the encryption codes assigned by the transaction manager 26 or the security manager 28. For example, the security manager 28 accesses the security database 30 to retrieve applicable encryption codes. The encryption scheme from the encryption module 38 may be applied before or after the packetization.

The communications network 40 represents an intranet, the Internet, a public communications network, or a private communication network. The source communications device 10, the intermediary communications node 14, and destination communications device 42 may access the communications network 40 via a server of an Internet service provider, a public switched telephone network (PSTN), or other telecommunications infrastructure.

The destination communications device 42 includes a receiver 16. The receiver 16 may include a decryption module 22 for decrypting the encrypted data message transmitted by the transmitter 36 of the intermediary communications node 14. The receiver 16 is coupled to a communication manager 56. In turn, the communication manager 56 is coupled to a transmitter 36.

The communication manager 56 includes an authentication module 52 for authenticating a received submittal password, authenticating a received submittal log-in identifier, and determining a proper encryption code associated with one or more data messages transmitted by the intermediary communication node 14. The authentication module 52 maintains an authentication database (not shown) for storing a reference log-in identifier and a reference password for comparison to received submittal password and submittal log-in identifier received from the intermediary communication node 14. If the reference log-in identifier matches the received submittal log-in identifier and if the reference password matches the received submittal password, the intermediary communications node 14 is granted access for communication with the destination communications device 42. In turn, a communications channel may be established between a source data processing system 8 and a destination data processing system 9.

At the intermediary communications node 14, the security manager 28, the security database 30 and encryption module 38 cooperate with the decryption module 22 and authentication module 52 of the destination communications device 42 to provide secure communications between the intermediary communications node 14 and the destination communications device 42. Secure communications refers to password-protected communications, encrypted communications, or both. In one embodiment, a decryption module 22 in the receiver 16 of the destination communications device 42 references the authentication module 52 to retrieve the appropriate decryption code or encryption code for decrypting the transmitted information (e.g., data message) after successful authentication of a submittal log-in identifier and its associated submittal password. At least one reference encryption code may be associated with corresponding reference log-in identifier in the authentication database to facilitate decoding of encrypted data messages sent between the intermediary communications node 14 and the destination communications device 42. Accordingly, the foregoing architecture of FIG. 1 is well suited for business-tobusiness transaction requiring end-to-end security between a first business entity and a second business entity.

If the authentication module 52 determines that one or more data messages are authorized, the authentication module 52 may trigger the status code generator 54 to generate an acknowledgement for transmission as feedback to the intermediary communications node 14.

In one example, the acknowledgment provides verification to the disruption detector 25 that access to the destination communications device 42 has been successfully established. In another example, the status code generator 54 may provide a confirmation that one or more particular data messages were successfully transmitted from the intermediary communications node 14 and received at the destination communications device 42.

The acknowledgement provided by the status code generator 54 may or may not be encrypted by the encryption module 38 of the transmitter 36 in the destination communications device 42. The intermediary communications node 14 is arranged to receive the acknowledgement at the receiver 16 and may provide control data from the disruption detector 25 to the transaction manager 26 to trigger appropriate action based upon the acknowledgement. For example, the transaction manager may access the message-dependency database 34 to retrieve and execute a message handling code. The disruption of a transmission or delivery of an earlier data message may be used to determine how a later data message is delivered from the intermediary communications node 14 to the destination communications device 42.

In an alternate embodiment, the communications system 11 of FIG. 1 may feature additional security enhancements, such as employment of the Secure Socket Layer or firewalls. HTTP protocol and XML protocol support security features such as Secure Socket Layer (SSL) to facilitate secure communications between the intermediary communications node 14 and the destination communications device 42. Although FIG. 1 does not show firewalls, in practice firewalls may be interposed between the communications network 40 and the destination communications device 42 or between the communications network 40 and the intermediary communications node 14 to prevent unauthorized users from gaining access to the intermediary communications node 14 or the destination communications device 42.

Figure 2A:
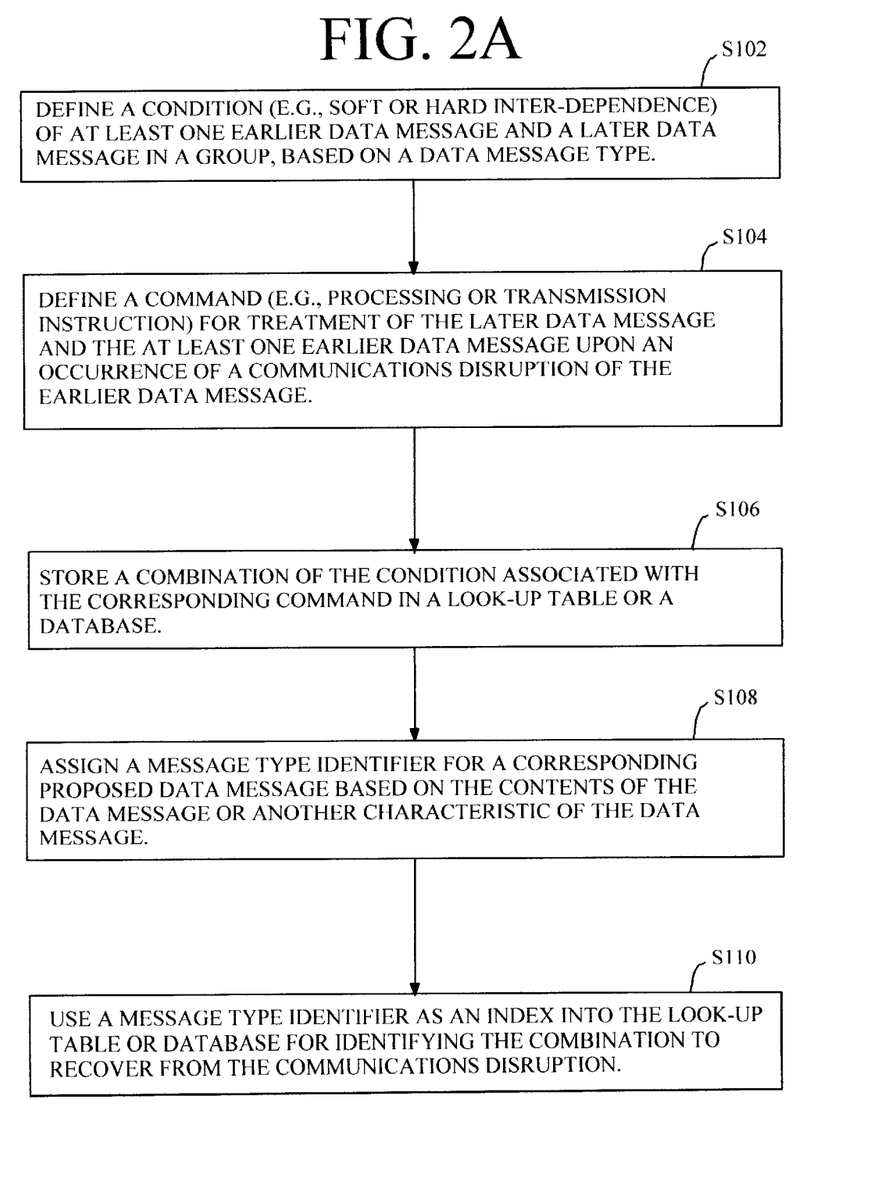
FIG. 2A is a flow chart of a method for defining inter-dependent data messages in accordance with the invention.

FIG. 2A illustrates a flow diagram of a method for defining inter-dependent data messages in accordance with the invention. FIG. 2A starts with step S102.

In step S102, an intermediary communications node 14 defines a dependency characteristic or condition associated with a group of data messages based on a message type of the group of data messages. The group of data messages includes at least one earlier transmitted data message and a later data message. An earlier transmitted data message refers to a data message that the source data processing system 8 or the source communications device 10 generates prior to the later data message. The dependency characteristic or condition may refer to hard inter-dependence between or among data messages in a group, soft inter-dependence between or among data messages in a group, or independence between or among data messages in a group.

A hard inter-dependent data message refers to a blocking data message. A hard inter-dependent data message refers to a data message that requires the transmission of multiple data messages within the group until completion upon a communications disruption. The soft inter-dependent data message refers to a non-blocking data message in which a transmission of a group of data message may be interrupted because as few as one data message per group may be transmitted. Thus, a soft inter-dependent data message may refer to a data message that requires the transmission of a later or latest data message in a group. The independent data message does not require any transmission relationship among the data messages in the group.

The transactional manager 26 may only recognize the dependency characteristic upon the occurrence of a communications disruption. A communications disruption refers to a disruption or failure of a communications path between a source data processing system 8 (e.g., source enterprise resource planning system) and a destination data processing system 9 (e.g., enterprise resource planning system).

In step S104 following step S102, the intermediary communications node 14 defines a message handling command associated with the respective dependency characteristic condition. The handling command provides instructions for a subsequent treatment of a later data message and the at least one earlier data message of a group. If the later data message and the earlier data message are members of the same group, the later and earlier data messages are designated as affiliated data messages. The handling command defines the delivery, processing, or transmission instructions for the affiliated data messages in the group.

In step S106, the transaction manager 26 or the message-dependency manager 32 stores a combination of the condition associated with the corresponding command in a message-dependency database 34. The message-dependency database 34 refers to a look-up table or a relational database. The intermediary communications node 14 may use a message type identifier for identifying the combination in the message-dependency database 34.

In step S108, the source communications device 10 or source data processing system 8 assigns an actual message type identifier for a corresponding proposed data message based on the contents of the data message, or otherwise. For example, as the source communications device 10 generates a data message or prepares the data message for transmission, the source communications device 10 dynamically assigns an actual message type identifier to the data message. For example, types of data messages may include purchase order data messages or forecast data messages for transactional subjects (e.g., goods or materials).

In step S110, the message-dependency manager 32 uses the message type identifier for subsequent retrieval and execution of a handling command upon the detection of a disrupted data message with a corresponding message type identifier.

The above defining of the message inter-dependency supports flexible treatment of data messages received at the intermediary communications node 14 that may be tailored to provide reliable communications with sequential or repetitive transmissions to enhance reliability or non-redundant transmissions to reduce bandwidth used between the intermediary communications node 14 and the destination communications node 42. Further, the intermediary communications node 14 may act as an intermediary to filter out outdated data messages that might otherwise overwrite later (i.e., more current) data messages at the destination communications device 42. Thus, the defined pairs of dependency characteristics and handling commands may be structured to optimize bandwidth usage over the communications network 40 or reliability in data processing.

Figure 2B:
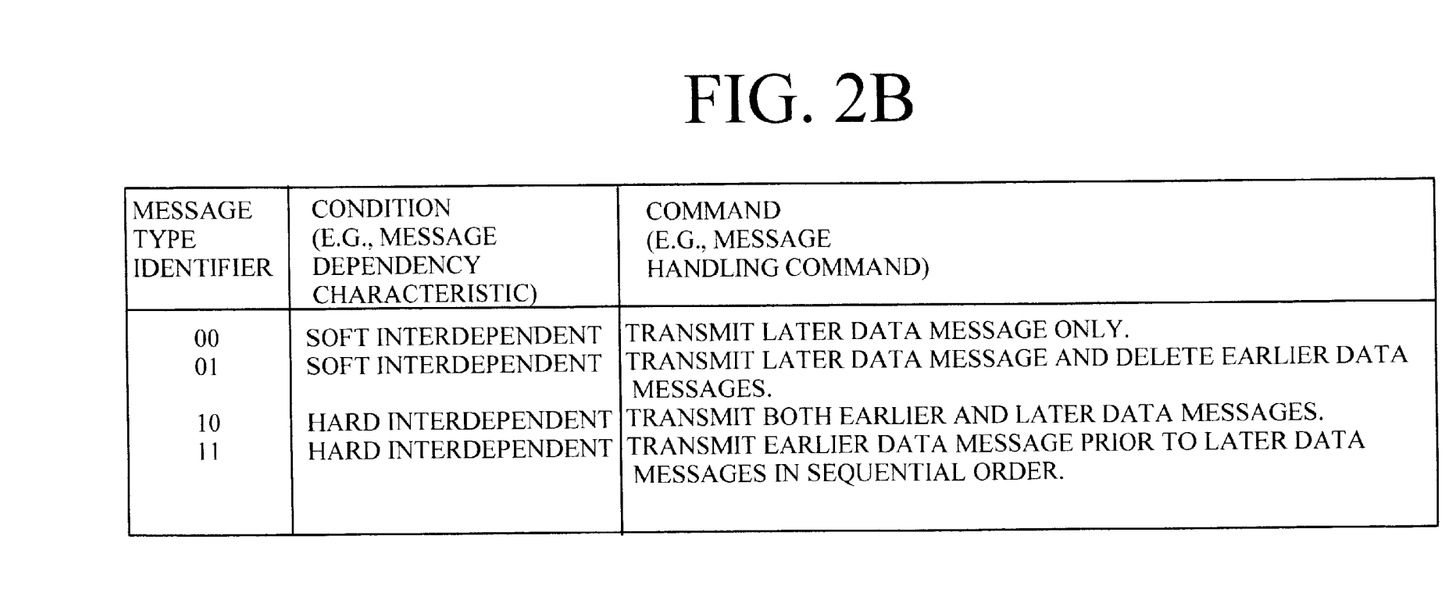
FIG. 2B is a chart showing handling commands associated with corresponding data message types in accordance with the invention.

FIG. 2B shows a chart of different message types associated with corresponding message interdependencies. The chart of FIG. 2B provides reference data in the event that one or more earlier data messages suffer a communications disruption between a source data processing system 8 and the destination data processing system 9. The chart of FIG. 2B may be applied to communication disruptions within a business entity's internal network as well as communications over a communications network 40, such as the Internet. The source communications device 10 or the intermediary communications node 14 maintains a buffer memory (e.g., buffer memory 18) of a group of data messages which may include at least one earlier data message and a later data message. The source communications device 10 or the intermediary communications node 14 may purge the buffer memory (e.g., buffer memory 18) once it receives an acknowledgment of successful data message transmission from the destination communications device 42, or the buffer memory may be purged in accordance with any other scheme that maintains the reliability and integrity of data transmission.

A leftmost column of FIG. 2B contains message type identifiers to distinguish different message types from one another. A middle column defines a condition (e.g., message-dependency characteristic) associated with each respective message type. A rightmost column of the chart contains commands (e.g., message handling commands) associated with respective conditions.

The message type identifiers are numbers or symbols that may be used to distinguish one message type from another. The message type identifiers may be stored in the header of each data message of a group. The message type identifiers are associated with corresponding conditions that define the relationship between two or more data messages in a group within the buffer memory 18. Possible conditions include soft inter-dependent, hard inter-dependent, or independent data messages. Here, only hard inter-dependent and soft-interdependent data messages are shown in FIG. 2B. The conditions are affiliated with respective commands for the treatment of data messages upon the disruption of communications between the source data processing system 8 and the destination data processing system 9, or otherwise.

A hard interdependent data message requires at least two data messages within a group to be transmitted. A hard interdependent data message may require the transmission of data messages in a group in accordance with a certain sequential order. The destination communications device 42 may know and use the sequential order to interpret the hard interdependent data messages in a group. In one example, the sequential order may be last-in, first-out for a group of data messages. In another example, the sequential order may be first-in, first-out for the data messages in a group. The use of hard interdependent data messages can prevent overwriting of later or more accurate data message with an earlier or less accurate data message because the data messages are transmitted in sequential order as a group. Thus, the earlier data and later data may be distinguished by the order of arrival of data messages at the destination communications device 42. A data message that contains purchase order data may be characterized as a hard interdependent data message to allow the latest data message to be used for fulfilling orders at a supplier in a reliable and accurate manner.

A soft interdependent data message requires the data messages of a group to be filtered prior to transmission from a source communications device 10 to a destination communications device 42. In accordance with one filtering scheme, only a latest data message of a group of soft interdependent data messages is transmitted to reduce the burden on the communications resources of the communications network 40 and the processing resources of the destination communications device 42. The use of soft interdependent data messages can prevent overwriting of later or more accurate data message with an earlier or less accurate data message at the destination communications device 42 because the only the latest data message of a group is transmitted.

Some data messages may be independent, as opposed to soft interdependent or hard interdependent. If a message is independent, a chance exists of overwriting an earlier data message with a later data message at the destination. Further, if data messages are independent, a later data message may be transmitted prior to an earlier data message, so the context of the data messages may not form a basis for error checking or reliability enhancement. Thus, independent data messages may be used sometimes where the accuracy of the data message is not appreciably diminished by the possibility of over-writing data messages.

In the first row of FIG. 2B, a first message type may have a message type identifier 00. The first message type represents one variety of a soft inter-dependent data message. The first message type is associated with a command for transmitting only a later data message of a group of successive data messages. For example, the intermediary communications node 14 transmits the first message type from the buffer memory 18 or transmission queue to the destination communications device 42 upon the detection of a communications disruption of the earlier transmitted data message.

In the second row, a second message type may have a message type identifier 01. The second message type represents another variety of a soft inter-dependent data messages. The second message type is associated with a command for transmitting a later data message and deleting earlier data messages of a successive group of data messages. For example, the intermediary communications node 14 transmits a later data message of the second message type from the buffer memory 18 or the transaction queue 24 to the destination communications device 42 upon the detection of a communication disruption of the earlier transmitted data message.

In the third row, a third message type may have a message type identifier. The third message type represents one variety of a hard inter-dependent data message. The third message type is associated with a command for transmitting both an earlier and later data messages. For example, the intermediary communications node 14 transmits at least one earlier and a later data message of the third message type from the buffer memory 18 or transaction queue 24 to the destination communications device 42 upon the detection of a communications disruption of the earlier transmitted data message.

In the fourth row, a fourth message type may have a message type identifier 11. The fourth message type represents another variety of a hard inter-dependent data message. The fourth message type is associated with a command for transmitting an earlier data message prior to later data messages in sequential order. For example, the intermediary communications node 14 transmits an earlier and a later data message or transaction queue of the fourth message type in sequential order from the buffer memory to the destination communications device 42 upon the detection of a communications disruption of the earlier transmitted data message.

Figure 2C:
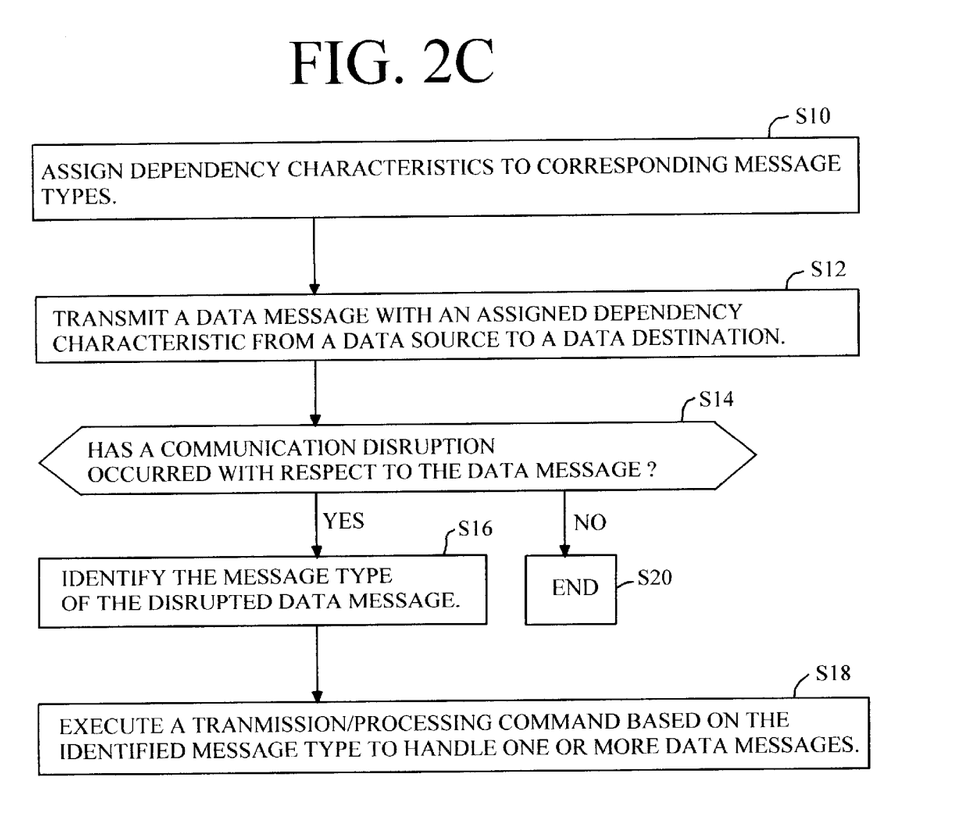
FIG. 2C is a flow chart of a method for managing inter-dependent data messages in accordance with the invention.

FIG. 2C is a method of managing inter-dependent data messages to maintain communications and data processing reliability. For example, the method of FIG. 2C may be used to maintain communications reliability of data messages transmitted from the source data processing system 8 to the destination data processing system 9 over the communications network 40, such as the Internet.

A disruption may occur in the communications path between the source data processing system 8 and the destination data processing system 9. At the destination site, a data message may be transferred from the destination communications device 42 to the destination data processing system 9. A disruption may occur in the communications path between the intermediary communications node 14 and the destination communications device 42 as well as the communications path between the destination communications device 42 and the destination data processing system 9. Accordingly, data dependency feature of the invention may be applied successively at both the intermediary communications node 14 and the destination communications device 42. The method of FIG. 2 starts in step S10.

In step S10, a source data processing system 8 or a source communications device 10 assigns a dependency characteristic to corresponding message types. The message types may be established in accordance with the subject matter content of different data messages. For example, one message type may be reserved for purchase order data, whereas another message type may be reserved for forecast data on potential future purchase orders. Each different message type may have a corresponding message type identifier as set forth in the illustrative example of FIG. 2B.

The dependency characteristic may include designating a data message as a soft inter-dependent data message, a hard inter-dependent data message, or an independent data message. A soft inter-dependent data message and a hard inter-dependent data message may represent broad characterizations of a data message, and further subdivision of the data message within the classification of soft-inter-dependent data message or a hard inter-dependent data message may be possible. Accordingly, a variety of different soft-interdependent data messages may exist and the variety may be defined with reference to associated message handling commands. Likewise, a variety of hard inter-dependent data messages may exist and the variety may be defined with reference to handling commands.

In step S12, the source communications device 10 transmits a data message with the assigned dependency characteristic from the source data processing system 8 to the destination data processing system 9 over a communications network 40, such as the Internet. One part of the transmission of step S12 may involve storing and forwarding one or more groups of data messages in the buffer memory 18 or transaction queue 24 of the intermediary communications node 14. For example, the intermediary communications node 14 transmits a data message within a buffer memory 18 or transaction queue 24 to the destination communications device 42.

In step S14, the intermediary communications node 14 determines if a communication disruption has disrupted or impeded the transmission of the data message in step S12. If the transmitted data message is disrupted or impeded, the destination communications device 42 may not receive or may not correctly receive the data message. After a data message is transmitted between a source data processing system 8 and a destination data processing system 9 in step S12, the destination communications device 42 may send an acknowledgement message upon successful receipt of a data message transmitted from the source processing system 8 via the intermediary communications node 14. Accordingly, if the intermediary communications node 14 does not receive an acknowledgment within a certain duration after transmission from the intermediary communications node 14 or after repeating the transmission from the intermediary communications node 14 a maximum number of times, the communications system 11 may conclude that the communication of the data message has been disrupted. A communications disruption may include a network failure, the failure of a network element, the failure of a router, the failure of a telecommunications switch, an error rate that exceeds a threshold, a failure of a communications line, or any other disturbance or interference that impedes the flow of reliable communications of a transmitted data message over the communications network 40.

If a communications disruption occurred as determined by the intermediary communications node 14, the method continues with step S16. If no communications disruption occurred as determined by the intermediary communications node 14, the method ends in step S20.

In step S16, the intermediary communications node 14 identifies the message type of the earlier transmitted disrupted data message. For example, upon the failure to receive an acknowledgement of a successful transmission of the earlier transmitted data message, the intermediary communications node 14 may access the earlier transmitted data message in the buffer memory 18, the transaction queue 24, an archived database, or elsewhere. Further, the intermediary communications node 14 may read the header of the data message or another portion (e.g., body) of the data message to determine the message type identifier.

In step S18 after step S16, the intermediary communications node 14 executes a message handling command (e.g., transmission or processing command) based on the identified data message type to handle one or more data messages in the buffer memory 18. For example, the intermediary communications node 14 may access the message-dependency database 34. The message-dependency database 34 may represent a database or a look-up table similar to that of FIG. 2B. In the message-dependency database 34, the source communications device 10 selects a handling command for a corresponding message type identifier of the disrupted data message. Four possible message-handling commands or procedures are illustrated in FIG. 2B. Any of the four possible message-handling commands or procedures may be invoked in step S18.

In accordance with a first procedure for step S18, the intermediary communications node 14 only transmits a later data message in the buffer memory 18 or transaction queue 24 and ignores the earlier data messages of a group. At a later time, the earlier data messages may be overwritten by other new data messages that are stored in the buffer memory 18. The later data message may contain the only accurate or useful information for a first message type. Therefore, elimination of the transmission of the earlier data messages reduces the volume of data transmitted over the communications network 40, potentially saving costs for the involved business entities. Further, the elimination of the transmission of earlier data messages reduces the burden of data processing for the destination communications device 42 and eliminates the chance that the destination communications device 42 may overwrite valid or more accurate data with less accurate data in the earlier data messages.

In accordance with a second procedure for step S18, the intermediary communications node 14 transmits a later data message in the buffer memory 18 or the transaction queue 24 and deletes earlier date messages in the group. The deletion of the earlier data messages in the group may avoid the possibility of inadvertent transmission of the earlier data messages to the destination communications device 42 from the intermediary communications node 14. The deletion of the earlier data messages may afford more space and flexibility in the storage of newer outgoing data messages in the buffer memory 18, transaction queue 24, or elsewhere in the intermediary communications node 14. Moreover, the inadvertent use of outdated, earlier data messages at the destination communications device 42 is prevented by not transmitting outdated, earlier data messages to the destination communications device 42 in the first place.

In accordance with a third procedure for step S18, the intermediary communications node 14 transmits both earlier and later data messages in the buffer memory 18, the transaction queue 24, or elsewhere in any order. The third procedure may be used where both the earlier and the later data messages in the group contain valuable information for processing at the destination communications device 42 or the destination data processing system 9.

In accordance with a fourth procedure for step S18, the intermediary communications node 14 transmits the earlier and later data messages of a group of data messages in the buffer memory 18, transaction queue 24, or elsewhere in sequential order. Accordingly, the destination communications device 42 may use the contextual order of the data messages for error checking of redundant information or otherwise. The proper processing of the data messages at the destination communications device 42 may rely on the provision of the earlier and later data messages of group in successive order. For example, if the order of the data messages are kept intact, the destination communications device 42 may overwrite an earlier received data message with a later received data message with the assurance that the later received data message contains the most accurate or up-to-date data. Accordingly, the destination data processing system 9 may rely upon the accuracy of the data message for making a business decision.

Figure 3:
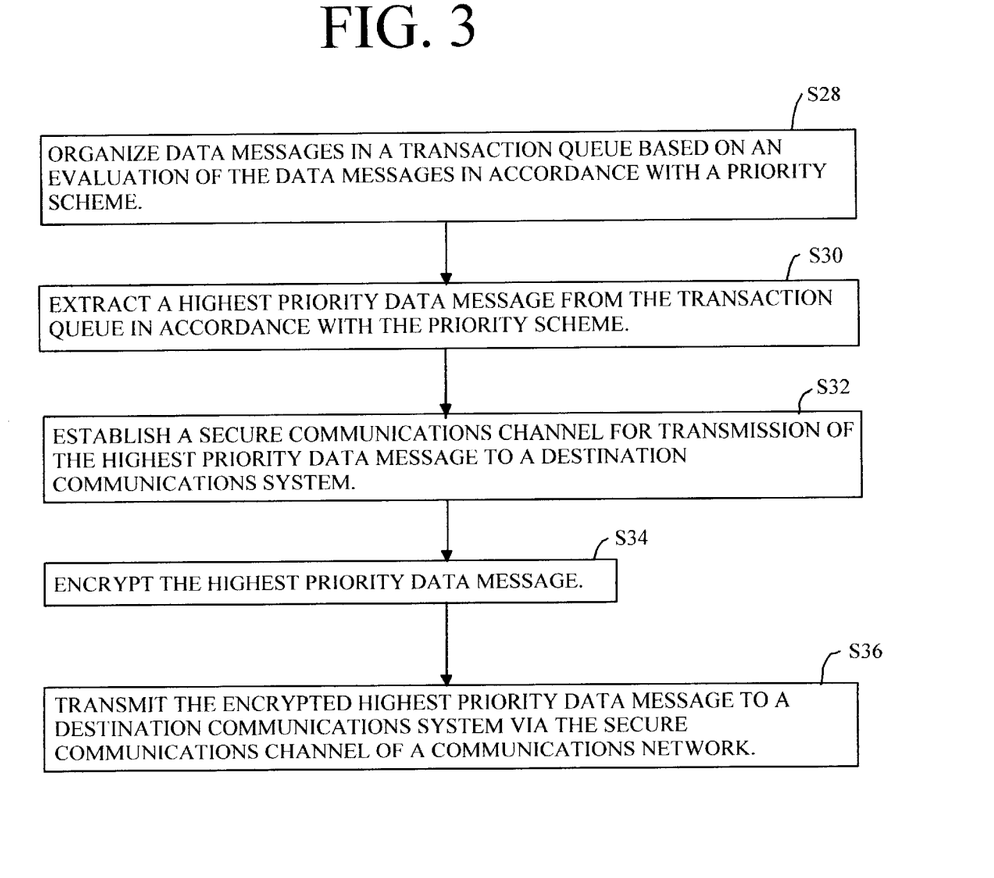
FIG. 3 is a flow chart of a method for maintaining security of a data message handled by an intermediary communication node in accordance with the invention.

FIG. 3 is a flow chart of the method for maintaining security of a data message handled by an intermediary communication nodes 14 in accordance with the invention. The method of FIG. 3 starts in step S28.

In step S28, the request handler 20 organizes data messages in the transaction queue 24 based on an evaluation of the data messages in accordance with a primary priority scheme. The request handler 20 may remove (or copy) data messages from the buffer memory 18 to place them in the transaction queue 24. Step S10 may involve the request handler 20 following a primary priority scheme such as a first-in, first-out (FIFO) scheme or last-in, first out (LIFO) to assign data messages to one or more queues within the transaction queue 24. In a FIFO scheme, a first message received in the buffer memory 18 is given an earlier scheduled transmission time than a latter message received in the buffer memory 18 from the source communications device 10.

The request handler 20 may operate in accordance with a recovery priority scheme in addition to the primary priority scheme if a communications disruption occurs in the transmission of a data message over the communications network 40 or between the source data processing system 8 and the destination data processing system 9. For example, a recovery priority scheme may assign different dependency characteristics to the data messages based upon a message type identifier. The recovery priority scheme temporarily suspends the primary priority scheme until a handling command is successfully executed.

In an alternate embodiment, a dependency characteristic may be based upon a destination identifier contained in a data message or a source identifier contained in the data message. The destination identifier or source identifier is an electronic label used to identify a particular source communications device (e.g., source communications device 10) or a particular destination communications device (e.g., destination communications device 42).

In step S30, the transaction manager 26 extracts a highest priority data message from the transaction queue 24 in accordance with the primary priority scheme. After extracting the highest priority data message and authorizing its transmission, the transaction manager 26 may access a lesser priority data message in the transaction queue 24 so that a group of data messages are prepared for transmission.

In step S32, the security manager 28 cooperates with the security database 30 to establish a secure communications channel for transmission of the highest priority data message to a destination communications device 42 via the communications network 40. The establishing of a secure communications channel may involve authentication or a verification of a submittal log-in identifier and a submittal password submitted by the security manager 28 in the intermediary communications node 14 to the destination communications device 42. A secure communications channel refers to one or more of the following: a password-protected, one-way or two-way communications channel that restricts access to unauthorized users that do not enter a correct password in accordance with an authentication procedure, an encrypted or encoded communications channel, a spread-spectrum modulated communications channel, and any other communications security mechanism.

After the secure communications channel is established, in step S34 the encryption module 38 of the transmitter 36 encrypts the highest priority data message in accordance with an encryption code, which may be provided by the security manager 28 of the intermediary communications node 14.

In step S34 in step S36, the transmitter 36 transmits the encrypted highest priority data message to a destination communication device 42 via the secure communications channel of the communication network 40.

Following step S36, the destination communications device 42 is arranged to receive the encrypted highest priority data message. The receiver 16 includes the decryption module 22 for the decrypting highest priority data message or other data messages in accordance with a decryption or an encryption code provided by the authentication module 52. The encryption codes stored in the authentication module 52 and the security database 30 are preferably maintained in a synchronized manner such that updates of the encryption code in the authentication database 52 at the destination communications device 42 follow updates to an encryption code in the security database 30.

Figure 4:
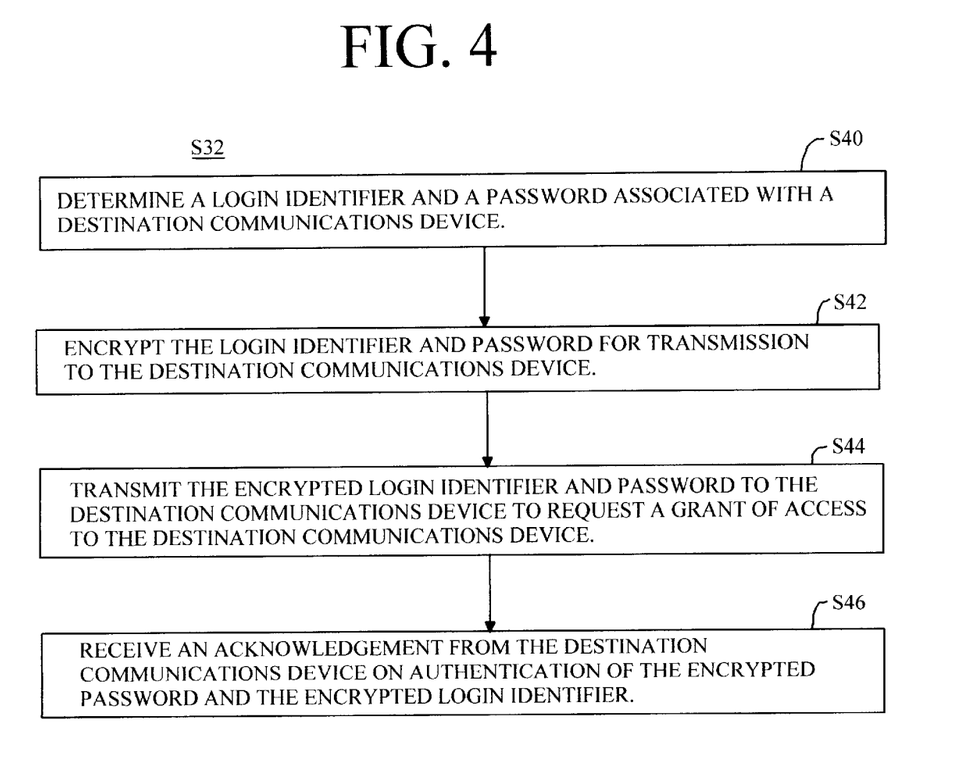
FIG. 4 is a flow chart that shows a procedure for establishing a secure communication channel in greater detail than FIG. 3.

FIG. 4 shows step S32 of FIG. 3 in greater detail. In step S40 of FIG. 4, the transaction manager 26 or the security manager 28 determines a log-in identifier and a password associated with a destination communications device 42. Each destination communications device 42 associated with the communication network may have at least one unique log-in identifier and at least one unique corresponding password.

The transaction manager 26 references the security database 30 in preparation for the transmission of the data message from the intermediary communications node 14 to the destination communications device 42. The transaction manager 26 may reference a message type identifier, a source identifier, or a destination identifier of the data message to determine the applicable submittal password and submittal log-in identifier to be retrieved from the security database 30.

In step S42, the encryption module 38 of the intermediary communications node 14 preferably encrypts the submittal log-in identifier, the submittal password, or both for transmission to the destination communications device 42. The encryption prevents fraudulent eavesdroppers from obtaining unauthorized access to the destination communications device 42 by interception of the submittal password identifier, the submittal log-in identifier, or both.

In step S44, the transmitter 36 of the intermediary communication node transmits the encrypted password to the destination communications device 42 to request the grant of communications access to the destination communications device 42 via a one-way or two-way communications channel. The destination communications device 42 determines whether to grant or deny access based on authentication of the received submittal log-in identifier and the received submittal password.

After step S44 in step S46, if the destination communication device 42 authenticates the transmitted encrypted password, then the intermediary communications node 14 receives an acknowledgment from the destination communications device 42 on the authentication of the encrypted password. The destination communications device 42 maintains a database of reference passwords and reference log-in identifiers. At the destination communications device 42, the communication manager 56 compares the received submittal log-in identifier and the corresponding received submittal password to the reference login identifier and the corresponding reference stored password in the database. If the received submittal log-in identifier matches the reference log-in identifier and if the received submittal password matches the reference password, the communications manager 56 provides an authorization for granting communications access (e.g., data exchange privileges over a one-way or two-way communications channel) between at least the destination communications device 42 and the intermediary communications node 14. Accordingly, the method of FIG. 4 supports the secure exchange of data messages between the source data processing system 8 and the destination data processing system 9.

Further, after step S46 of FIG. 4 the method may return to steps S34 of FIG. 3 and step S36 in which the encrypted data message of the highest priority is transmitted from the intermediary communications node 14 to the destination communications device 42.

Figure 5:
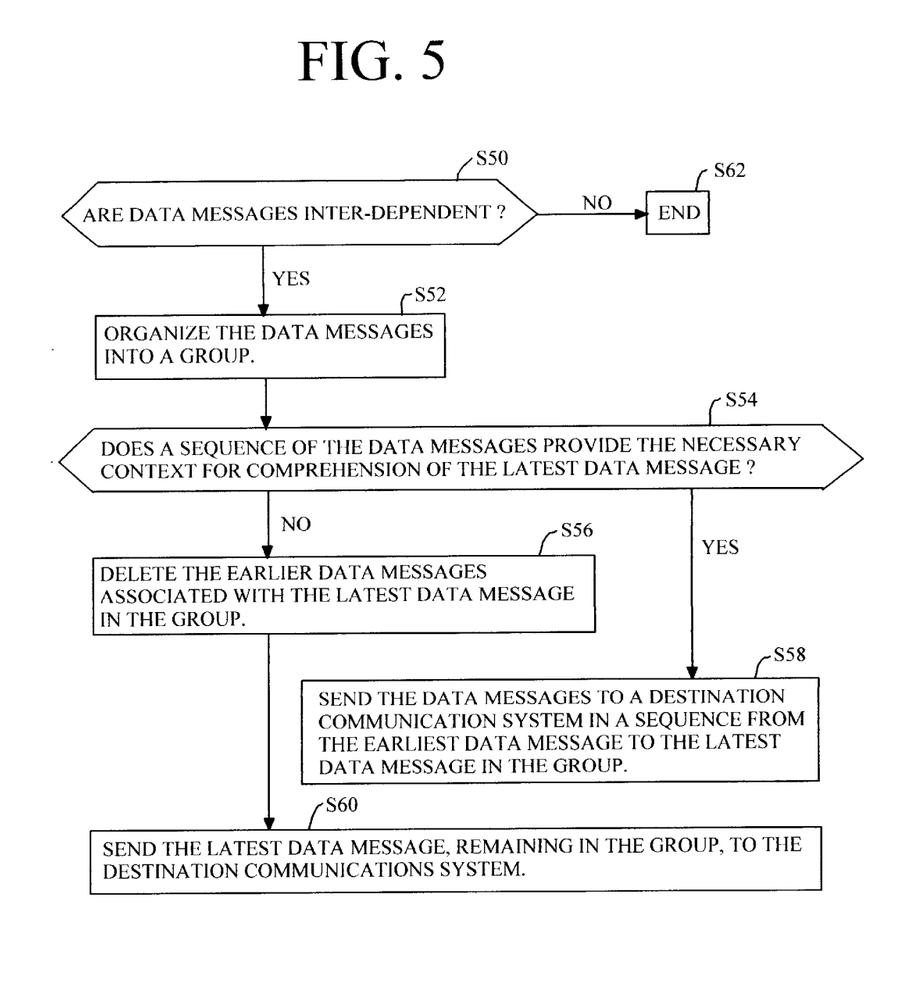
FIG. 5 is a flow chart of a method for processing inter-dependent data messages in accordance with the invention.

FIG. 5 shows a method of processing inter-dependent data messages in accordance with the invention. FIG. 5 starts in step S50.

In step S50, the source communications device 10 or the intermediary communications node 14 determines if at least two data messages are inter-dependent. The source communications device 10 or the intermediary communications node 14 may determine whether at least two messages are interdependent based on several alternative techniques. In accordance with a first technique, data messages may be regarded as inter-dependent if a source identifier, a destination identifier, and a transactional identifier associated with the different data messages match each other. In accordance with a second technique, interdependent data messages may be flagged in advance in a header or another designated portion of a data message. For example, the source communications device 10 or the source data processing system 8 may designate certain message types as inter-dependent. The message type is based on the contents or classification of the data message contents.

The communications system 11 may support different types of inter-dependent data messages. For example, the communications system 11 may support a soft inter-dependent data message and a hard inter-dependent data message. A soft inter-dependent data message may be referred to as a non-blocking data message. A hard inter-dependent data message may be referred to as a blocking data message. Blocking data messages are sent in a sequential group without interruption until the transmission is complete. In contrast, non-blocking data messages are sent or processed with permissible interruption prior to the completion of the transmission or processing of multiple data message in a group.

A soft inter-dependent data message may be defined such that the latest message has the greatest priority. Further, the soft inter-dependent data message may not require a previously sent data message to understand a subsequent data message. If a later message contains most or all of the information of an earlier data message, the later message and the earlier message may be regarded as soft inter-dependent data messages.

A hard inter-dependent data message may be defined such that the sequence in which the data messages are received or decoded is essential to the comprehension of the hard inter-dependent data messages. The sequence of the data messages may provide the necessary context for understanding the contents of hard inter-dependent data messages. In contrast, soft interdependent data messages typically can be understood regardless of the order of receipt or decoding.

If the data messages are determined to be inter-dependent in step S50, the method continues with step S52. If the data messages are determined not to be inter-dependent, the method ends with step S62.

In step S52, the source communications device 10 or the intermediary communications node 14 organizes the data messages into a group. For example, the intermediary communications node 14 may organize the data messages into a queue within a buffer memory 18 or the transaction queue 24 to stage or prepare the data messages for transmission to the destination communications device 42.

In step S54 after step S52, the intermediary communications node 14 determines whether the sequence and contents of any earlier transmitted data messages in the group provide the necessary context for comprehension of the latest data message in the group. If the sequence of the data messages provides the necessary context, the method continues with step S56. If the sequence of the data message does not provide the necessary context, the method continues with step S58.

In step S56, the intermediary communications node 14 deletes the earlier data message or earlier data messages in the group associated with the latest data message of the group. The communications system 11 or the intermediary communications node 14 may be arranged to delete older inter-related or interdependent data messages associated with a more recent data message. Accordingly, if a transmitter 36 assembles soft interdependent data messages into a group, older data messages may be deleted prior to transmission of the group.

In step S58, the intermediary communications node 14 sends the data messages to a destination communications device 42 in a sequence from the earliest data message to the latest data message in the group. Accordingly, if a transmitter 36 assembles hard inter-dependent data messages into a group, the data messages in the group are preferably transmitted in a sequential order. The sequential order may be latest to earliest data message, or vice versa, so long as both the source communications device 10 and the destination communications device 42 use the same order by convention or mutual agreement.

In step S60, the intermediary communications node 14 sends the latest data message, remaining in the group, to the destination communications device 42. Accordingly, by identifying whether an inter-dependent data message is hard inter-dependent or soft inter-dependent, the communications system 11 may realize efficiency in managing the transmission of redundant or somewhat redundant information in the transmission of later hard inter-dependent data messages. For example, redundant information in a group of hard inter-dependent data messages, the contents of later data messages may be cross-checked against the context or contents of earlier data messages for error reduction or comprehension improvement. With regard to soft inter-dependent data messages, the communications system 11 may eliminate the need to transmit earlier outdated data messages when such information has been replaced by a later (i.e., newer) data message, without regards to the context of earlier outdated data messages. In sum, the method of FIG. 5 for managing the interdependent data messages supports the reliable transmission of data between the source communications device 10 and the destination communications device 42 in a spectrally efficient manner.

The foregoing description of the invention describes several illustrative examples of the invention. Modifications, alternative arrangements, and variations of these illustrative examples are possible and may fall within the scope of the invention. Accordingly, the following claims should be accorded the reasonable broadness interpretation, which is consisted with the specifications disclosed here and not unduly limited by aspects of the preferred embodiments disclosed herein.

What is claimed is:

1. A method of managing communications of a data message, the method comprising the steps of:
    assigning a dependency characteristic to a corresponding message type for at least one earlier transmitted data message of a group;
    determining if a communication disruption has occurred for the at least one earlier transmitted data message in the group; and
    executing a handling command for the group if the disruption occurred, the handling command consistent with the dependency characteristic assigned to the at least one earlier transmitted data message; and
    transmitting a later data message of the group based on the handling command associated with the corresponding message type.

2. The method of claim 1 wherein the assigning step comprises assigning a soft interdependency between data messages of the group, the soft interdependency blocking a transmission of at least one of the data messages in the group.

3. The method of claim 1 wherein the assigning step comprises assigning a hard interdependency between data messages of the group, the hard interdependency permitting the transmission of multiple data messages in the group.

4. The method of claim 1 wherein the executing step comprises transmitting a the later data message of the group following the at least one earlier transmitted data message.

5. The method of claim 1 wherein the executing step comprises transmitting a the later data message and deleting the at least one earlier data message of the group.

6. The method of claim 1 wherein the executing step comprises transmitting both the at least one earlier data message and a the later data message of the group.

7. The method of claim 1 wherein the executing step comprises transmitting the at least one earlier transmitted data message prior to the later data message of the group in sequential order.

8. A system of managing communications of a data message, the system comprising the steps of:
 a message-dependency manager for assigning a dependency characteristic to a corresponding message type for the at least one earlier transmitted data message of a group;
 a disruption detector for determining if a communication disruption has occurred for the at least one earlier transmitted data message in the group;
 a transaction manager for executing a handling command for the group if the disruption occurred, the handling command consistent with the dependency characteristic assigned to the at least one earlier transmitted data message; and
 wherein the transaction manager is operable to transmit the later data message of the group based on the handling command associated with the corresponding message type in a message-dependency database.

9. The system according to claim 8 wherein the message-dependency manager assigns a soft interdependency between data messages of the group, the soft interdependency including preventing a transmission of at least one of the data messages in the group.

10. The system according to claim 8 wherein the message-dependency manager assigns a bard interdependency between data messages of the group, the hard interdependency including permitting the transmission of multiple data messages in the group.

11. The system according to claim 8 further comprising:
 a transmitter coupled to the transaction manager, the transmitter including an encryption module for encrypting a data message; and
 a receiver for receiving an encrypt data message from the transmitter, the receiver including a decryption module for decrypting the encrypted data message.

12. The system according to claim 8 further comprising:
 a security database associated with the transaction manager;
 a security manager for retrieving a submittal log-in identifier and a corresponding submittal password from the security database; and
 a transmitter for transmitting the submittal log-in identifier and the submittal password.

13. The system according to claim 12 further including:
 a receiver for receiving the submittal log-in identifier and the submittal password from the transmitter;
 an authentication module associated with the receiver for accessing a reference password and a reference log-in identifier for comparison to the tendered submittal log-in identifier and the corresponding submittal password to establish a communications chamel between the transmitter and the receiver.

14. A system of managing communications of a data message, the system comprising the steps of;
 a message-dependency manager for assigning a dependency characteristic to a corresponding message type for the at least one earlier transmitted data message of a group;
 a disruption detector for determining if a communication disruption has occurred for the at least one earlier transmitted data message in the group;
 a transaction manager for executing a handling command for the group if the disruption occurred, the handling command consistent with the dependency characteristic assigned to the at least one earlier transmitted data message; and
 wherein the transaction manager is operable to transmit a later data message of the group and to delete the at least one earlier data message in the group based on the handling command associated with a corresponding message type of a message-dependency database.

15. A system of managing communications of a data message, the system comprising the steps of:
 a message-dependency manager for assigning a dependency characteristic to a corresponding message type for the at least one earlier transmitted data message of a group;
 a disruption detector for determining if a communication disruption has occurred for the at least one earlier transmitted data message in the group;
 a transaction manager for executing a handling command for the group if the disruption occurred, the handling command consistent with the dependency characteristic assigned to the at least one earlier transmitted data message; and
 wherein the transaction manager is operable to transmit a later data message of the group and to transmit the at least one earlier data message in the group based on the handling command associated with a corresponding message type of the in a message-dependency database.

16. A system of managing communications of a data message, the system comprising the steps of:
 a message-dependency manager for assigning a dependency characteristic to a corresponding message type for the at least one earlier transmitted data message of a group;
 a disruption detector for determining if a communication disruption has occurred for the at least one earlier transmitted data message in the group;
 a transaction manager for executing a handling command for the group if the disruption occurred, the handling command consistent with the dependency characteristic assigned to the at least one earlier transmitted data message; and
 wherein the transaction manager is operable to transmit the at least one earlier data message prior to a later data message of the group in sequential order based on the handling command associated with a corresponding message type in message-dependency database.

17. A method for supporting the communication of interdependent data messages via a communications network, the method comprising the steps of:

determining if at least two data messages are interdependent;

organizing the at least two data messages into a group if they are determined to be interdependent; and deleting at least one earlier message in the group if a sequence of the data messages in the group does not support contextual understanding of a latest data message in the group.

18. The method according to claim 17 further comprising the steps of:

sending the latest data message remaining in the group to a destination communication system.

19. A method for supporting the communication of interdependent data messages via a communications network, the method comprising the steps of:

determining if at least two data messages are interdependent;

organizing the at least two data messages into a group if they are determined to be inter-dependent; and sending the group of data messages to a destination communication system in a sequence from an earliest data message to a latest data message in the group wherein the sending step is executed if a sequence of the data messages provide a context for comprehension of the latest data message.

* * * * *

UNITED STATES PATENT AND TRADEMARK OFFICE
CERTIFICATE OF CORRECTION

PATENT NO. : 6,687,700 B1
DATED : February 3, 2004
INVENTOR(S) : Shawn S. Cornelius et al.

It is certified that error appears in the above-identified patent and that said Letters Patent is hereby corrected as shown below:

<u>Column 2,</u>
Line 48, please delete the period "." between "device" and "42".

<u>Column 5,</u>
Lines 19 and 20, please delete "a synchronous" and insert -- a-synchronous --.

<u>Column 6,</u>
Line 19, please delete "tobusiness" and insert -- to-business --.

<u>Column 18,</u>
Line 5, please delete "chamel" and insert -- channel --.

Signed and Sealed this

Twenty-seventh Day of April, 2004

JON W. DUDAS
*Acting Director of the United States Patent and Trademark Office*